United States Patent [19]

Tadokoro et al.

[11] Patent Number: 4,513,707
[45] Date of Patent: Apr. 30, 1985

[54] MULTIPLE PORT INTAKE MEANS FOR ROTARY PISTON ENGINES

[75] Inventors: Tomoo Tadokoro; Haruo Okimoto; Ikuo Matsuda, all of Hiroshima, Japan

[73] Assignee: Toyo Kogyo Co., Ltd., Hiroshima, Japan

[21] Appl. No.: 487,052

[22] Filed: Apr. 21, 1983

[30] Foreign Application Priority Data

Apr. 22, 1982 [JP] Japan ................................. 57-68185

[51] Int. Cl.³ ............................................. F02B 53/06
[52] U.S. Cl. ..................................... 123/242; 123/216
[58] Field of Search ......................... 123/216, 219, 242

[56] References Cited

U.S. PATENT DOCUMENTS 4,030,454  6/1977  Yamamoto et al. ................. 123/219
4,423,711  1/1984  Tadokoro et al. .................. 123/216

FOREIGN PATENT DOCUMENTS 153820 12/1980 Japan .................................. 123/216

Primary Examiner—Michael Koczo
Attorney, Agent, or Firm—Fleit, Jacobson, Cohn & Price

[57] ABSTRACT

A rotary piston engine including a casing comprised of a rotor housing and a pair of side housings attached to the opposite sides of the rotor housing to define a rotor cavity. A substantially triangular rotor is disposed in the rotor cavity. The intake system includes a light load intake port formed in one of the side housings so as to open to the rotor cavity, a medium load and heavy load intake ports formed in the other side housing. The light load and medium load intake ports are formed so that they are opened to a working chamber before the chamber is disconnected from the exhaust port. The heavy load intake port is associated with a control valve which is closed under light and medium load operations. The medium load intake port has an effective area smaller than that of the light load intake port and is closed earlier than the light load intake port.

4 Claims, 5 Drawing Figures

MULTIPLE PORT INTAKE MEANS FOR ROTARY PISTON ENGINES

The present invention relates to rotary piston engines and more particularly to an intake system for rotary piston engines.

Conventional rotary piston engines include a casing comprised of a rotor housing having trochoidal inner wall and a pair of side housings attached to the opposite sides of the rotor housing to define a rotor cavity therein, and a substantially polygonal rotor disposed in the casing for rotation with apex portions in sliding engagement with the inner wall of the rotor housing to define working chambers of variable volumes to conduct intake, compression, combustion, expansion and exhaust strokes.

The casings are formed with exhaust and intake ports which open respectively to the working chambers in the exhaust and intake strokes. The exhaust ports are usually formed in the rotor housings and the intake ports in either or both of the rotor and side housings. In conventional rotary piston engines, the exhaust and intake ports are so located that there is an overlap period wherein the ports are opened simultaneously to the same working chamber. In this arrangement, problems have been encountered in that the combustion gas in the exhaust port is at first drawn under the intake suction pressure through the intake port into the intake passage and then back into the working chamber in the intake stroke as the volume of the working chamber increases. The combustion gas thus taken into the intake working chamber dilutes the intake mixture possibly producing misfire. This causes rough engine operations and an increase in the amount of pollutant emissions in the exhaust gas. The adverse effect of the overlap is particularly significant in idling and light load engine operations wherein the charge of the intake mixture is relatively small. It has therefore been conventional practice to supply comparatively rich air-fuel mixture of small air-fuel ratio in the idling and light load conditions to obtain a stable operation. However, the solution has not been satisfactory because fuel consumption cannot be decreased to a level that can meet the requirement in recent years. It is therefore advisable to eliminate the aforementioned overlap period.

In rotary engines of a peripheral port type having intake ports formed in the rotor housings, however, it is extremely difficult to arrange the intake and exhaust ports so that the overlap can be avoided. In a side port type wherein the intake ports are formed in the side housings, it is possible to arrange the intake ports so that the overlap can be avoided, however, in such arrangements, the opening areas of the intake ports are limited in various respects and it becomes impossible to supply a sufficient amount of intake mixture to meet the high output requirement. More specifically, in an intake port formed in the side housing, the radially inner edge of the port must be outside the trace of the oil seal carried by the rotor. The location of the radially outer edge is determined by the port opening timing, whereas the location of the leading side edge as seen in the direction of rotor rotation is determined by the port closing timing. Thus, in order to avoid the overlap between the intake and exhaust ports, the radially outer edge of the intake port must be located radially inwardly as compared with conventional intake ports. This will cause a decrease in the port area and in order to compensate for such a decrease in the port area, the location of the leading edge must be changed so that the port closing time is delayed. However, a delay in the intake port closing timing will cause a blow back of the intake mixture into the intake passage, particularly in heavy load, low speed engine operations, to thereby cause a decrease in the intake charge and consequently a decrease in the compression pressure in the working chamber.

In view of the aforementioned problems, in U.S. Pat. No. 4,423,711, there is proposed a rotary piston engine comprising a first intake port formed in one of the side housings so as to open to the rotor cavity at the working chamber in the intake stroke after the same working chamber is substantially disconnected from the exhaust port, a second intake port formed in the other side housings so as to be opened through at least one opening to the rotor cavity at the working chamber in the intake stroke and disconnected from the same working chamber later than the first intake port, and a control valve associated with the second intake port and adapted to close the second intake port in light load engine operation. According to the proposed arrangement, only the first intake port is used to draw the intake mixture into the working chamber under a light load engine operation and since the first intake port is located so that there is no overlap period between the exhaust and intake ports, there is no risk that the exhaust gas in the exhaust port is drawn into the intake port means. In heavy load operation and possibly in medium load operation, the control valve is opened and a sufficient amount of intake mixture can be drawn to meet the increased output requirement. In a preferable aspect, one of the side housings may further be formed with a third intake port which opens to the rotor cavity at the working chamber in the intake stroke after the same working chamber is substantially disconnected from the exhaust port and closed substantially simultaneously with the first intake port. The intake system may include a primary intake passage having a primary throttle valve and a secondary intake passage having a secondary throttle valve which is closed under a light load operation, and the primary passage may be connected with the first intake port and the secondary passage with the second and third intake ports. With this arrangement, it becomes possible to change the intake port area in the three stages in accordance with the engine load.

It has been found that the proposed arrangement provides significant advantages over conventional engines. However, it still has problems in medium load operation. More specifically, the primary passage connected with the first intake port may be formed with a relatively small cross-sectional area so that a sufficient intake flow speed can be maintained in light load engine operation, however, the secondary passage must be of a larger cross-sectional area so that a sufficient amount of intake flow can be passed to the working chamber for full load engine operation. Thus, under a medium load operation wherein the secondary throttle valve in the secondary passage is partially opened but the control valve is still closed, the intake gas flow through the secondary passage becomes relatively slow causing a poor atomization of fuel. Thus, it is very likely to produce an abnormal combustion at the trailing side of the working chamber possibly causing a knocking of the engine.

A further problem is found in the aforementioned type of engine in that a satisfactory mixture charge cannot be ensured throughout the engine operation. In general, in order to utilize the inertia of the intake gas for accomplishing a high charging efficiency, it is advisable to delay the closing timing of the intake port as much as possible and for this reason the first and third intake ports are formed so that they are closed simultaneously. However, since the intake flow speed at the third intake port is relatively low under medium load operation as described above, if the closing timings of the first and third intake ports are determined so that the flow inertia at the third port can be well utilized, it becomes impossible to utilize the flow inertia at the first intake port. Further, if the closing timings are so determined that the flow inertia at the first port can be well utilized, a blow back will be produced at the third port.

It is therefore an object of the present invention to provide an intake system for a rotary piston engine in which a sufficient flow speed can be ensured throughout the engine operating range.

Another object of the present invention is to provide an intake system for a rotary piston engine which can provide an adequate atomization of fuel throughout the engine operation.

A further object of the present invention is to provide an intake system for a rotary piston engine in which intake flow inertia can well be utilized to accomplish an efficient gas charging without producing blow back of intake gas to any of the intake ports.

According to the present invention, the above and other objects can be accomplished by a rotary piston engine including a casing comprised of a rotor housing having a trochoidal inner wall and a pair of side housings secured to the opposite sides of the rotor housing to define a rotor cavity therein, a substantially polygonal rotor disposed in said rotor cavity for rotation with apex portions in sliding engagement with the inner wall of the rotor housing to define working chambers of variable volumes to conduct intake, compression, combustion, expansion and exhaust strokes, exhaust port means formed in said casing so as to open to said rotor cavity at the working chamber in the exhaust stroke, first intake port means formed in said casing so as to open to said rotor cavity at the working chamber in the intake stroke, second intake port means formed in said casing so as to open to said rotor cavity at the working chamber in the intake stroke and located so that it is disconnected from the same working chamber later than the first intake port means, said second intake port means being associaaed with control valve means which opens the second intake port means in heavy load engine operation, third intake port means formed in said casing so as to open to said rotor cavity at the working chamber in the intake stroke and located so that it is disconnected from the same working chamber earlier than said first intake port means, primary intake passage means having primary throttle valve means and connected with said first intake port means, secondary intake passage means connected with said second and third intake passage means and having second throttle valve means which is closed under light load.

According to the features of the present invention, the secondary throttle valve means is closed under light load engine operation but opened under medium load and heavy load operations. Since the control valve means is closed under the medium load engine operation, the intake gas is drawn to the engine only through the first and third intake port means. The present invention is characterized by the fact that the third intake port means is located so that it is disconnected from the intake working chamber earlier than the first intake port means. Therefore, it is possible to avoid blow back of intake gas to the third intake port even if the closing timing of the first intake port means is determined so that the flow inertia can well be utilized to obtain an increased mixture charge.

In a preferable aspect of the present invention, the third intake port means has an effective area which is smaller than that of the first intake port means. With this arrangement, it is possible to maintain an increased flow speed under a medium load operation at the third intake port means. Further, it is preferable that the first and third intake port means be located so that they are opened to the working chamber in intake stroke before the exhaust port means is disconnected from the same working chamber. With this arrangement, it becomes possible to increase the areas of the light load and medium load intake ports to thereby ensure a satisfactory intake gas charge.

The above and other objects and features of the present invention will become apparent from the following descriptions of a preferred embodiment taking reference to the accompanying drawings, in which.

Figure 1:
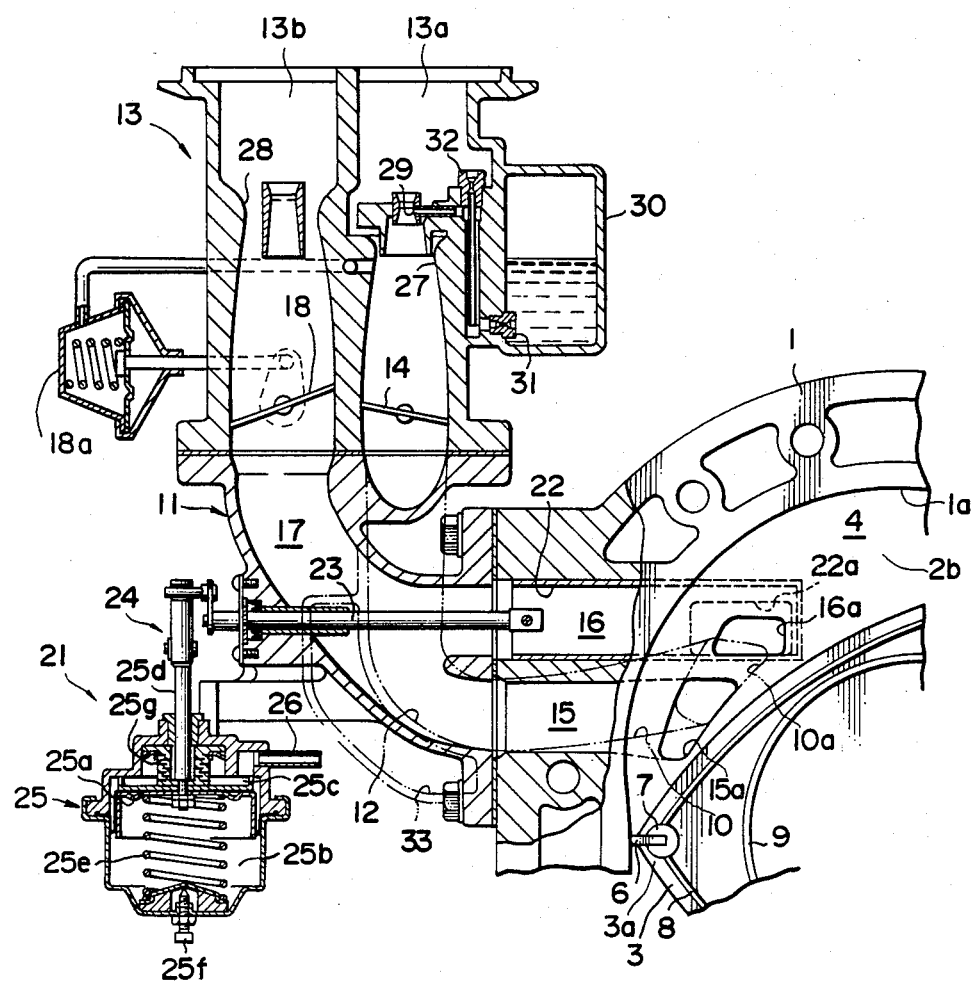
FIG. 1 is a fragmentary sectional view of a rotary piston engine in accordance with one embodiment of the present invention.
Figure 2:
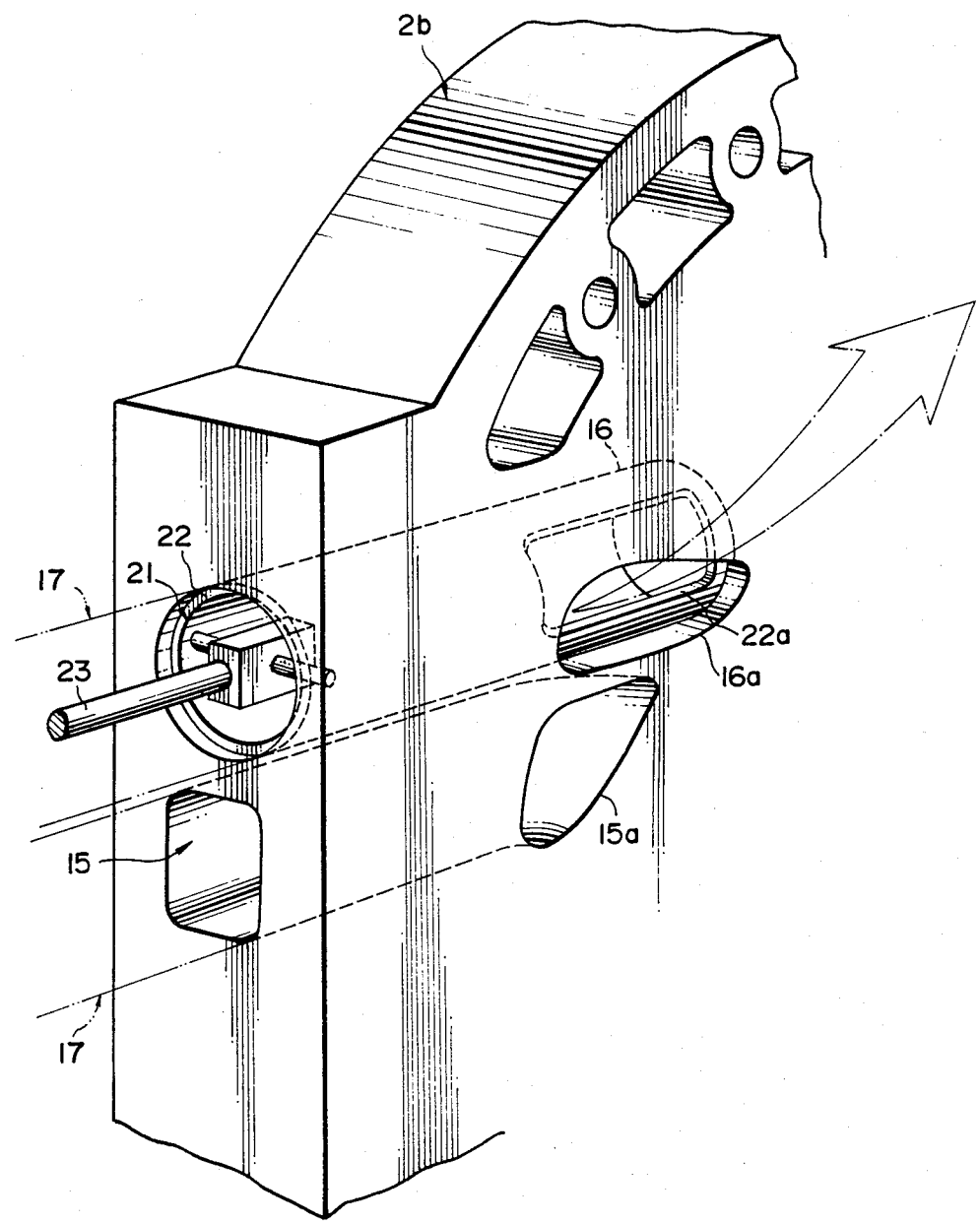
FIG. 2 is a fragmentary perspective view of a side housing formed with intake ports in accordance with the present invention.
Figure 3:
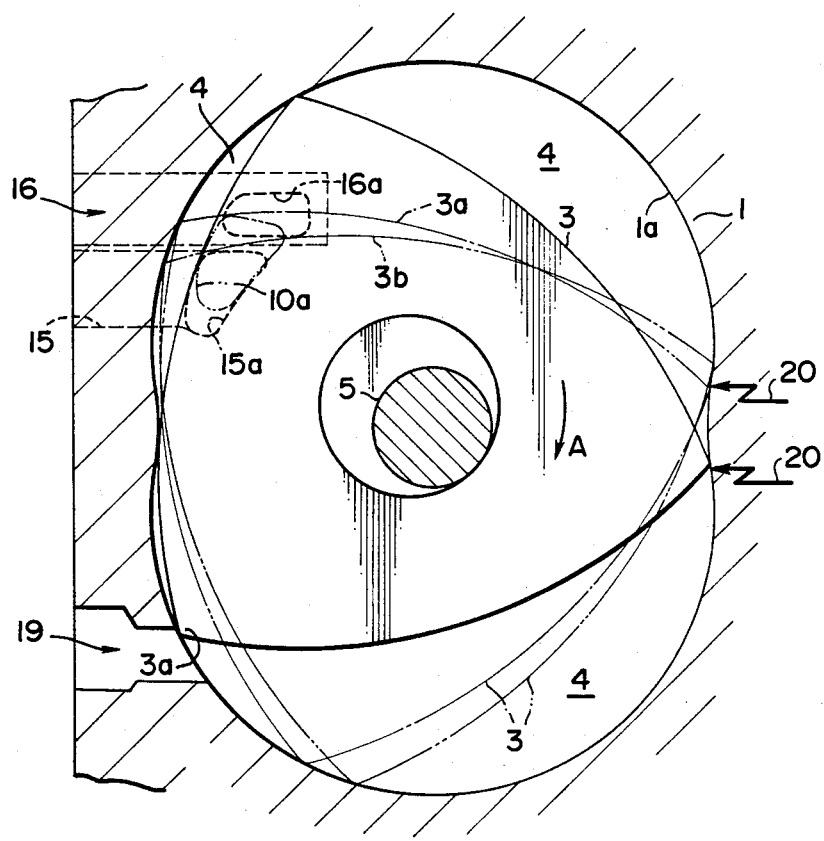
FIG. 3 is a diagrammatical illustration of a rotary piston engine showing the port arrangement.
Figure 4:
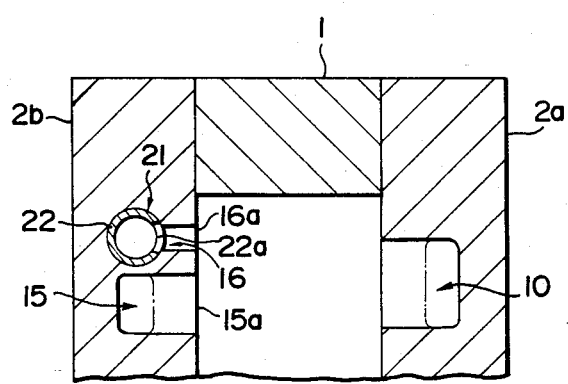
FIG. 4 is a longitudnal sectional view of the rotary piston engine.

Referring now to the drawings, particularly to FIGS. 1 through 4, there is shown a rotary piston engine including a rotor housing 1 and a pair of side housings 2a and 2b secured to the opposite sides of the rotor housing 1 to define a rotor cavity. The rotor housing 1 has an inner wall 1a which is of a trochoidal configuration as shown in FIG. 3. In the rotor cavity, there is disposed a substantially triangular rotor 3 for rotation with apex portions 3a in sliding contact with the inner wall 1a of the rotor housing 1 so as to define working chambers 4 of variable volume to conduct an intake, compression, combustion, expansion and exhaust strokes. The rotor 3 is carried by an eccentric shaft 5 and on the apex portions 3a of the rotors 3, there are provided apex seals 6 as well known in the art. Further, the rotor 3 is also provided with corner seals 7, side seals 8 and oil seals 9 as shown in FIG. 1.

As shown in the drawings, one of the rotor housings 2a is formed with light load intake port 10 which open through an opening 10a to the rotor cavity at the working chamber 5 which is in the intake stroke. Further, the other side housing 2b is formed with a medium load intake port 15 which is opened through an opening 15a to the rotor cavity as well as a heavy load intake port 16 which is opened through an opening 16a to the rotor cavity, both at the working chamber 5 in the intake stroke.

Figure 5:
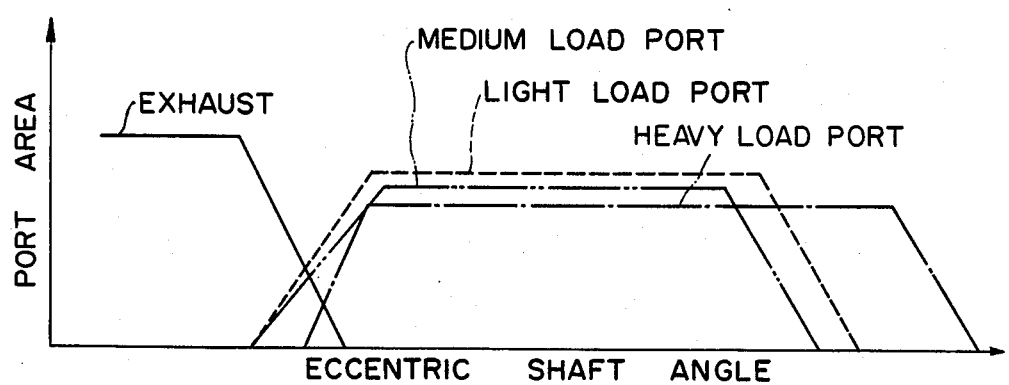
FIG. 5 is a diagram showing port timings in the embodiment shown in FIGS. 1 through 4.

The openings 10a, 15a and 16a of the intake ports 10, 15 and 16 are located so that they are cyclically closed by the side surfaces of the rotor 3. As shown in FIG. 3, the rotor housing 2 is formed with an exhaust port 19 which opens to the rotor cavity at the working chamber 4 in the exhaust stroke. Further, ignition plugs 20 are mounted on the rotor housing 1 as well known in the art. In FIG. 3, the rotor 3 rotates clockwise as shown by an arrow A. As shown in FIG. 5, the opening 10a of the light load intake port 10 is located so that it is opened to the intake working chamber 4 slightly before the same chamber is disconnected from the exhaust port 19 and closed at a relatively earlier stage so that the blow back of the intake mixture to the intake port 10 can be prevented. In FIG. 3, the position of the rotor 3 as shown by solid lines shows the timing at which the opening 10a is opened. The opening 16a of the heavy load intake port 16 is located so as to be closed after the port 10 is closed. The opening 16a may be so formed that it is opened later than the opening 10a. The opening 15a of the medium load intake port 15 is located so that it is opened simultaneously with the opening 10a of the light load intake port 10 and closed earlier than the opening 10a. The phantom lines 3a and 3a in FIG. 3 respectively show the positions of the rotor 3 wherein the port openings 10a and 15a are respectively closed. Further, the opening 15a has an area which is smaller than the opening 10a.

In the illustrated embodiment, the engine has a dual-barrel type carburetor 13 which includes a primary passage 13a and a secondary passage 13b. The carburetor 13 is mounted on the engine casing through a manifold assembly 11 having a primary intake passages 12 and a secondary intake passages 17 which are respectively connected with the passages 13a and 13b in the carburetor 13. The primary passage 13a in the carburetor 13 is provided with a primary throttle valve 14 and the secondary passage 13b with a secondary throttle valve 18. In the primary passage 13a, there is formd a primary venturi portion 27 in which a main fuel nozzle assembly 29 is provided as in conventional carburetors. The main fuel nozzle assembly 29 is connected through an air bleed device 32 and a main jet 31 with a float chamber 30. The secondary passage 13b is formed witha a seconary venturi portion 28 which may have a fuel nozzle assembly although not shown in FIG. 1. As well known in the art, the secondary throttle valve 18 starts to open after the primary throttle valve 14 has been substantially fully opened or under medium and heavy load operations. For the purpose, a suction pressure operated actuator 18a is provided for actuating the throttle valve 18 in accordance with the pressure in the passage 12. Alternatively, the throttle valve 18 may be interconnected with the throttle valve 14.

The primary passage 13a of the carburetor 13 is connected through the passages 12 in the manifold assembly 11 with the opening 10a of the intake port 10. The secondary passage 13b is connected through the passage 17 in the manifold assembly 11 with the openings 15a and 16a of the intake ports 15 and 16, respectively. The heavy load intake port 16 is provided adjacent to the opening 16a with a control valve 21 which includes a hollow cylindrical valve member 22 rotatably inserted into a cylindrical bore formed in the intake port 16. The valve member 22 has an aperture 22a which is aligned with the opening 16a as shown in FIG. 1 when the valve member 22 is in the position shown in FIG. 1 but disconnected from the opening 16a when the valve member 22 is rotated. The secondary intake passage 17 has a cross-sectional area which is greater than that of the primary intake passage 12 so that sufficient amount of air can be drawn to the working chamber 4 for heavy load operation. It will further be noted that the light load intake port 10 is inclined upwardly as compared with the medium load intake port 15 as seen in FIG. 1.

In order to rotate the cylindrical valve member 22, there is provided an actuator 25 which is comprised of a casing having a diaphragm 25a for dividing the interior of the casing into a pressure chamber 25c and an atmospheric pressure chamber 25b. The diaphragm 25a is connected with a push-pull rod 25d which is in turn connected through a link with an actuating rod 23 so that the axial movement of the rod 25d is converted into a rotation of the actuating rod 23. The actuating rod 23 is connected with the valve member 22 by means of a pin so that the rotation of the actuating rod 23 is transmitted to the valve member 22.

In the atmospheric pressure chamber 25b of the actuator 25, there is provided a compression spring 25e which biases the diaphragm 25a upwardly so that the valve member 22 is forced toward the position wherein the aperture 22a in the valve member 22 is disconnected from the opening 16a to thereby close the intake port 16. The force of the spring 25e can be adjusted by an adjusting screw 25f. The pressure chamber 25c is connected with an exhaust gas pressure pipe 16 which introduces the exhaust gas pressure into the chamber 25c. Since the exhaust gas pressure depends on the engine speed and the engine load, the valve member 22 is actuated according to these factors. It should however be noted that the valve member 22 may be actuated in accordance with a signal corresponding to the engine load only. In the pressure chamber 25c, there is provided a solid type bellows 25g which has circumferential slits formed alternately in inner and outer peripheries thereof. The bellows 25g encircles the rod 25d and attached at one end to the casing and at the other to the diaphragm 25a to thereby provide an expansible seal.

In idling or light load operations, the secondary throttle valve 18 of the carburetor 13 is closed so that there is no supply of intake mixture to the passage 17 leading to the intake ports 15 and 16. In this instance, the exhaust gas pressure is small so that the diaphragm 25a in the actuator 25 is forced under the influence of the spring 25e to maintain the control valve 21 in the closed position. Since the control valve member 22 is located close to the opening 16a, the dead volume in the port 16 is very small. Therefore, it is possible to decrease carrying over of the exhaust gas through the port 16. The intake mixture is supplied to the working chamber 4 only through the intake port 10. Since the intake port 10 is so located that it is opened to the working chamber 4 after the same working chamber 4 is substantially disconnected from the exhaust port 19, it is possible to eliminate or substantially decrease carrying over of the exhaust gas into the intake working chamber 4 due to the overlap between the intake and exhaust ports. Further, only one intake port 10 of a relatively small area is used for the rotor cavity so that it is possible to maintain a relatively high flow speed of the intake mixture to thereby provide an improved atomization and vaporization of fuel even under such idling or light load engine operations. Thus, it becomes possible to obtain stable combustion even with a relatively lean mixture and consequently fuel consumption can be significantly reduced.

In medium load operation, the secondary throttle valve 18 in the carburetor 13 starts to open. However, the exhaust gas pressure led to the chamber 25c of the actuator 25 is not sufficiently high to rotate the valve member 22. Thus, the aperture 22a is still disconnected from the opening 16a of the intake port 16. It should therefore be understood that the intake gas flow through the secondary intake passage 17 is led only to the intake port 15, so that the intake gas is drawn to the intake working chamber 4 through the intake ports 10 and 15. As described previously, the opening 15a of the intake port 15 is smaller than that of the opening 10a of the intake port 10 so that the intake flow through the intake port opening 15a can be maintained at a high speed under a medium load operation. It is therefore possible to accomplish a satisfactory atomization of fuel in both the light load and medium load intake ports 10 and 15 and thus the problem of knocking under a medium load can be solved.

Under the medium load operation, the intake gas flow through the port 10 is maintained at a relatively high speed since the primary intake passage 12 is of a a relatively small cross-sectional area, whereas the flow through the port 15 has a relatively low speed since it is passed through the secondary intake passage 17 of a relatively large cross-sectional area. Therefore, there is a possibility that the intake gas drawn to the intake working chamber 4 through the intake port 10 tends to be blown back to the intake port 15. However, since the port opening 15a is closed earlier than the port opening 10a, it is possible to prevent such blow back of intake gas. It therefore becomes possible to determine the closing timing of the port opening 10a so that the flow inertia of the intake gas through the intake port 10 can effectively be utilized to obtain a high mixture charging efficiency.

In heavy load operation, the secondary throttle valve 18 of the carburetor 13 is further opened and the exhaust gas pressure is increased beyond the value wherein the diaphragm 25a is moved against the influence of the spring 25e to actuate the valve member 22 to the open position wherein the aperture 22a in the valve member 22 is aligned with the port opening 16a. Thus, the intake mixture is supplied through all of the ports 10, 15 and 16. As shown in FIG. 2, in the illustrated embodiment, the arrangement is such that the port opening 16a starts to open at the leading side thereof as the valve member 22 is moved toward the fully open position. In the partially open position shown in FIG. 2, the intake mixture is therefore discharged toward the leading direction as shown by an arrow and provide a highly combustible atmosphere around the ignition plugs 20.

It will therefore be understood that a large amount of intake mixture is supplied under a heavy load operation through the intake ports 10, 15 and 16 to provide a high output power. It should be noted that the heavy load intake port 16 is so formed that it is closed later than the ports 10 and 15 to provide a sufficient amount of charge. The closing timing of the heavy load intake port 16 must be determined taking into consideration the problem of blow back of the intake mixture into the intake port. In the illustrated embodiment, the port timing can be controlled to a most suitable value for providing an optimum output power under a heavy load, high speed operation since the control valve 21 is actuated by the exhaust gas pressure which corresponds to the load and speed of the engine.

In the illustrated embodiment, it is preferable to provide the outer surface of the cylindrical valve member 22 and/or the inner surface of the cylindrical bore in the intake port 16 with a coating of a fluorinated resin such as Teflon for the purpose of providing a satisfactory lubrication. In order to eliminate the possible seizure of the valve member 22 in the cylindrical bore, it is recommendable to open the valve 21 under starting and decelerating operations because, in such operations, the intake port 16 does not have any adverse effect. The aperture 22a in the valve member 22 should preferably be larger than the port opening 16a. The actuator for the control valve member 22 may be of any type and may be operated by any signal which represents the engine load. For example, the engine intake pressure or the throttle valve position may be used alone or in combination with the engine speed.

The invention has thus been shown and described with reference to a specific embodiment, however, it should be noted that the invention is in no way limited to the details of the illustrated arrangements but changes and modifications may be made without departing from the scope of the appended claims. For example, the illustrated embodiment includes a carburetor for providing a combustible mixture but the invention can well be applied to a fuel injection type engine.

We claim:

1. A rotary piston engine including a casing comprised of a rotor housing having a trochoidal inner wall and a pair of side housings secured to the opposite sides of the rotor housing to define a rotor cavity therein, a substantially polygonal rotor disposed in said rotor cavity for rotation with apex portions in sliding engagement with the inner wall of the rotor housing to define working chambers of variable volumes to conduct intake, compression, combustion, expansion and exhaust strokes, exhaust port means formed in said casing so as to open to said rotor cavity at the working chamber in the exhaust stroke, first intake port means formed in said casing so as to open to said rotor cavity at the working chamber in the intake stroke, second intake port means formed in said casing so as to open to said rotor cavity at the working chamber in the intake stroke and located so that it is disconnected from the same working chamber later than the first intake port means, control valve means provided in said second intake port means for opening the second intake port means in heavy load engine operation, third intake port means formed in said casing so as to open to said rotor cavity at the working chamber in the intake stroke and located so that it is disconnected from the same working chamber earlier than said first intake port means, primary intake passage means having primary throttle valve means and connected with said first intake port means, secondary intake passage means connected with said second and third intake port means and having second throttle valve means which is closed under light load.

2. A rotary piston engine in accordance with claim 1 in which said first and third intake port means are located so that they are opened to the working chamber in the intake stroke before the same working chamber is disconnected from the exhaust port means.

3. A rotary piston engine in accordance with claim 1 in which said first intake port means is formed in one of the side housings whereas the second and third intake port means are formed in the other side housing.

4. A rotary piston engine in accordance with claim 1 in which said third intake port means has an effective area smaller than that of the first intake port means.

* * * * *